(12) United States Patent
Morishita et al.

(10) Patent No.: US 6,835,501 B2
(45) Date of Patent: Dec. 28, 2004

(54) ALKALINE RECHARGEABLE BATTERY

(75) Inventors: Nobuyasu Morishita, Toyohashi (JP); Toshifumi Ueda, Toyohashi (JP); Akihiro Taniguchi, Hirakata (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 140 days.

(21) Appl. No.: 10/142,157

(22) Filed: May 10, 2002

(65) Prior Publication Data
US 2003/0003366 A1 Jan. 2, 2003

(30) Foreign Application Priority Data

May 11, 2001 (JP) ........................... 2001-140964

(51) Int. Cl.[7] .................. H01M 2/14; H01M 10/26; H01M 10/24
(52) U.S. Cl. .............. 429/247; 429/206; 429/129; 429/223; 429/218.1
(58) Field of Search ..................... 429/247, 206, 429/129, 145

(56) References Cited

U.S. PATENT DOCUMENTS 3,716,411 A * 2/1973 Ogawa et al. .............. 429/206

FOREIGN PATENT DOCUMENTS

| JP | 6-333552 | 12/1994 |
| JP | 7-254430 | 10/1995 |

OTHER PUBLICATIONS

Celgard–Products/Flat sheets/Properties; www.celgard.net/products/fsmproperties.cfm.*
English Language Abstract of JP 6–333552.
English Lanugage Abstract of JP 7–254430.

* cited by examiner

Primary Examiner—Patrick Ryan
Assistant Examiner—Angela J. Martin
(74) Attorney, Agent, or Firm—Greenblum & Bernstein, P.L.C.

(57) ABSTRACT

An alkaline rechargeable battery, having an electrode plate group including positive electrode plates and negative electrode plates stacked alternately with separators interposed therebetween, arranged in such a manner that a volume of the separators before the initial charge and discharge accounts for 30 to 60% of a volume of the electrode plate group.

4 Claims, 3 Drawing Sheets

ALKALINE RECHARGEABLE BATTERY

The present disclosure relates to subject matter contained in priority Japanese Patent Application No. 2001-140964, filed on May 11, 2001, the contents of which is herein expressly incorporated by reference in its entirety.

BACKGROUND OF THE INVENTION

1. Field of the Invention

The present invention relates to an alkaline rechargeable battery, and more particularly to an alkaline rechargeable battery having an extended life by improving separators.

2. Description of Related Art

As an example of an alkaline rechargeable battery, a nickel-metal hydride rechargeable battery including positive electrode plates having nickel hydroxide as its active material, negative electrode plates having hydrogen-absorption alloy, and separators interposed therebetween, has been known and widely used.

With the alkaline rechargeable battery of this type, in order to increase a battery capacity, the separators are made as thin as possible to the extent that they are able to absorb a necessary quantity of electrolyte while functioning properly to prevent a short-circuit. In general, a volume of the separators is set to less than 30% of a volume of the electrode plate group.

However, the electrode plates gradually expand while the battery is charged and discharged repetitively, and when the volume of the separators is set to less than 30% of the volume of the electrode plate group, the expanded electrode plates crush the separators, and a quantity of the electrolyte retained in the separators is reduced. As a result, an internal resistance of the battery increases, which causes heat generation. Accordingly, an internal pressure increases and the safety vent operates to release a generated gas to the outside of the battery, whereby the electrolyte dries up and the battery becomes unusable in a short period.

SUMMARY OF THE INVENTION

In light of the conventional problems as discussed above, an object of the present invention is to provide an alkaline rechargeable battery having an extended life by improving separators.

An alkaline rechargeable battery according to the present invention includes an electrode plate group including positive electrode plates and negative electrode plates being superimposed with separators interposed therebetween, wherein a volume of the separators at least before initial charge and discharge (a period from assemblage to an initial charge of the battery) accounts for 30 to 60% of a volume of the electrode plate group. By setting a proportion of the separators in the electrode plate group in volume to 30% or higher, compression of the separators that shortens the service life of the battery is prevented. When the proportion is raised to more than 60%, it becomes difficult to release heat generated inside the battery to the outside, which deteriorates the life characteristics. Hence, by setting the proportion to 30 to 60%, a total quantity of electricity that the battery can be charged and discharged is increased and the life characteristics are enhanced, thereby providing a battery maintaining a high reliability over a long period.

In addition, it is preferable to set a plurality of voids of the separators before the initial charge and discharge to account for 50 to 70% of the separators. When a proportion of the voids exceeds 70%, a short-circuit readily occurs. When the proportion of the voids is lower than 50%, a volume for retaining an electrolyte is reduced, and the life characteristics are deteriorated.

Further, it is preferable to set a percentage of the volume of the electrode plate group before the initial charge and discharge in a capacity of a battery case to 85 to 95%. When the percentage is lower than 85%, an interval between the electrode plates becomes so large that the output characteristics are deteriorated, which increases an internal resistance and the life characteristics are deteriorated. When the percentage exceeds 95%, the separators are compressed, which makes it difficult for the separators to retain an electrolyte, and the life characteristics are deteriorated.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
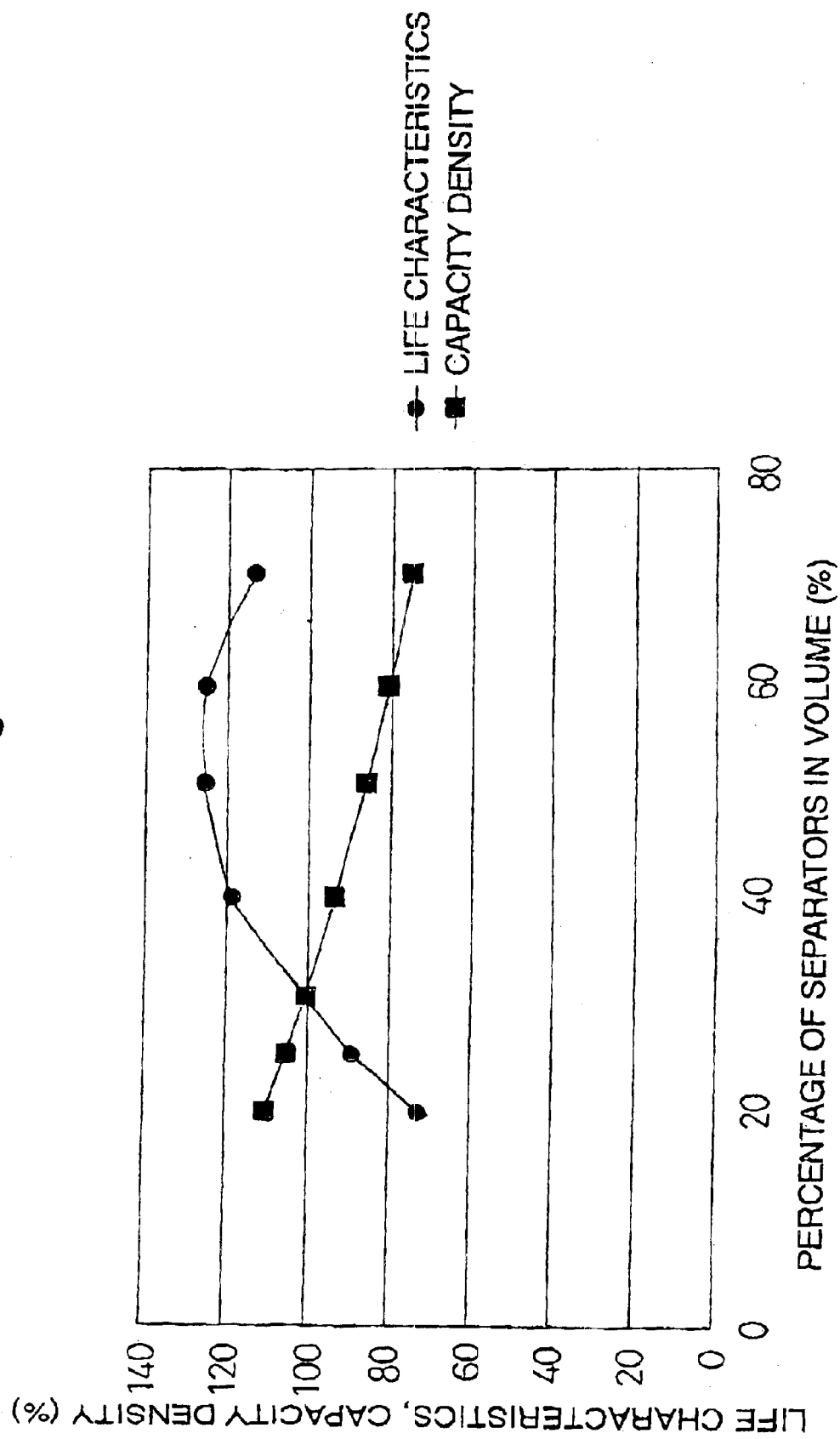
FIG. 1 is a graph showing life test results of an alkaline rechargeable battery according to an embodiment of the present invention and of a conventional example.

An embodiment of the present invention applied to a nickel-metal hydride rechargeable battery will be described with reference to FIGS. 1 to 3.

Figure 2:
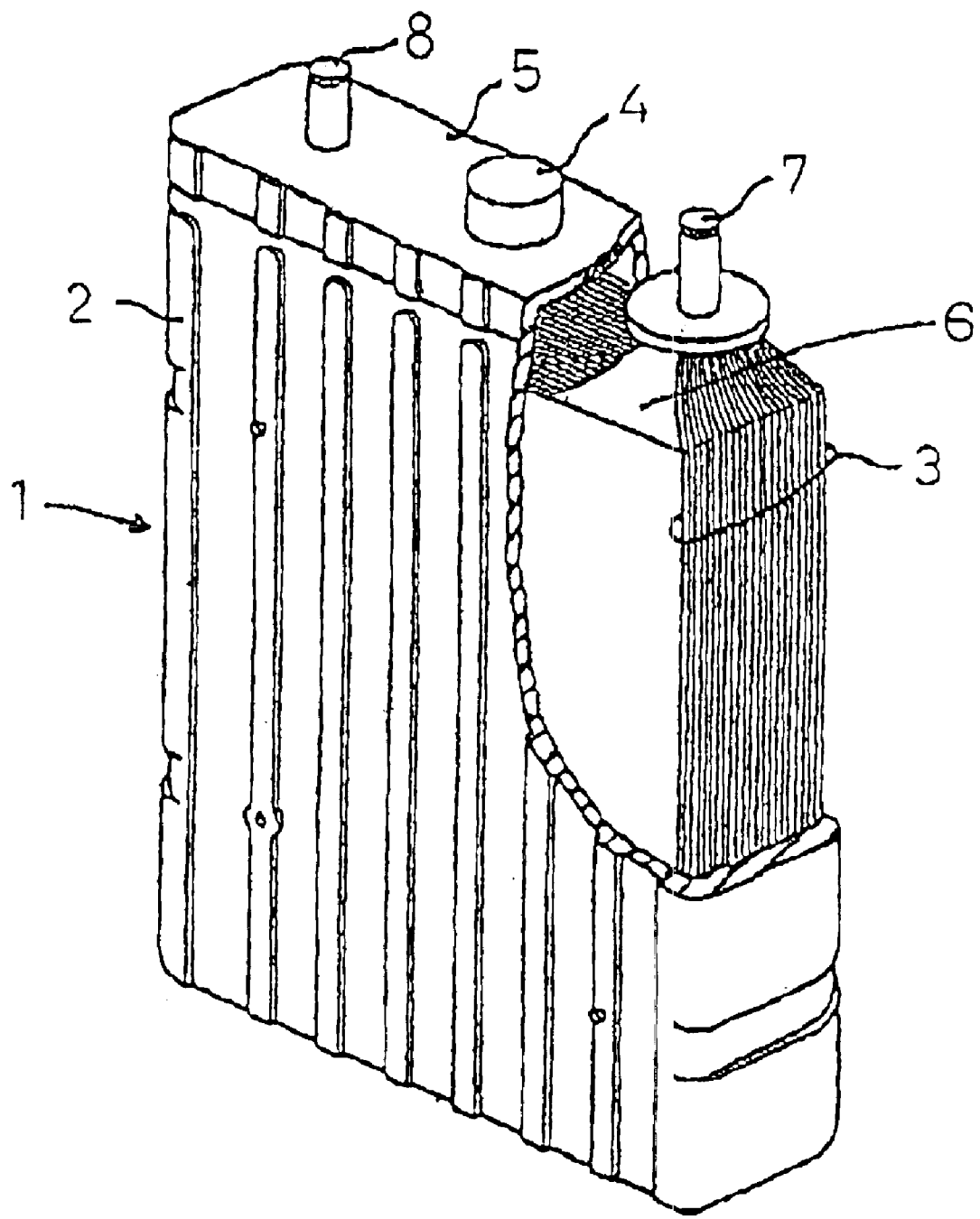
FIG. 2 is a partially broken perspective view of an alkaline rechargeable battery.
Figure 3:
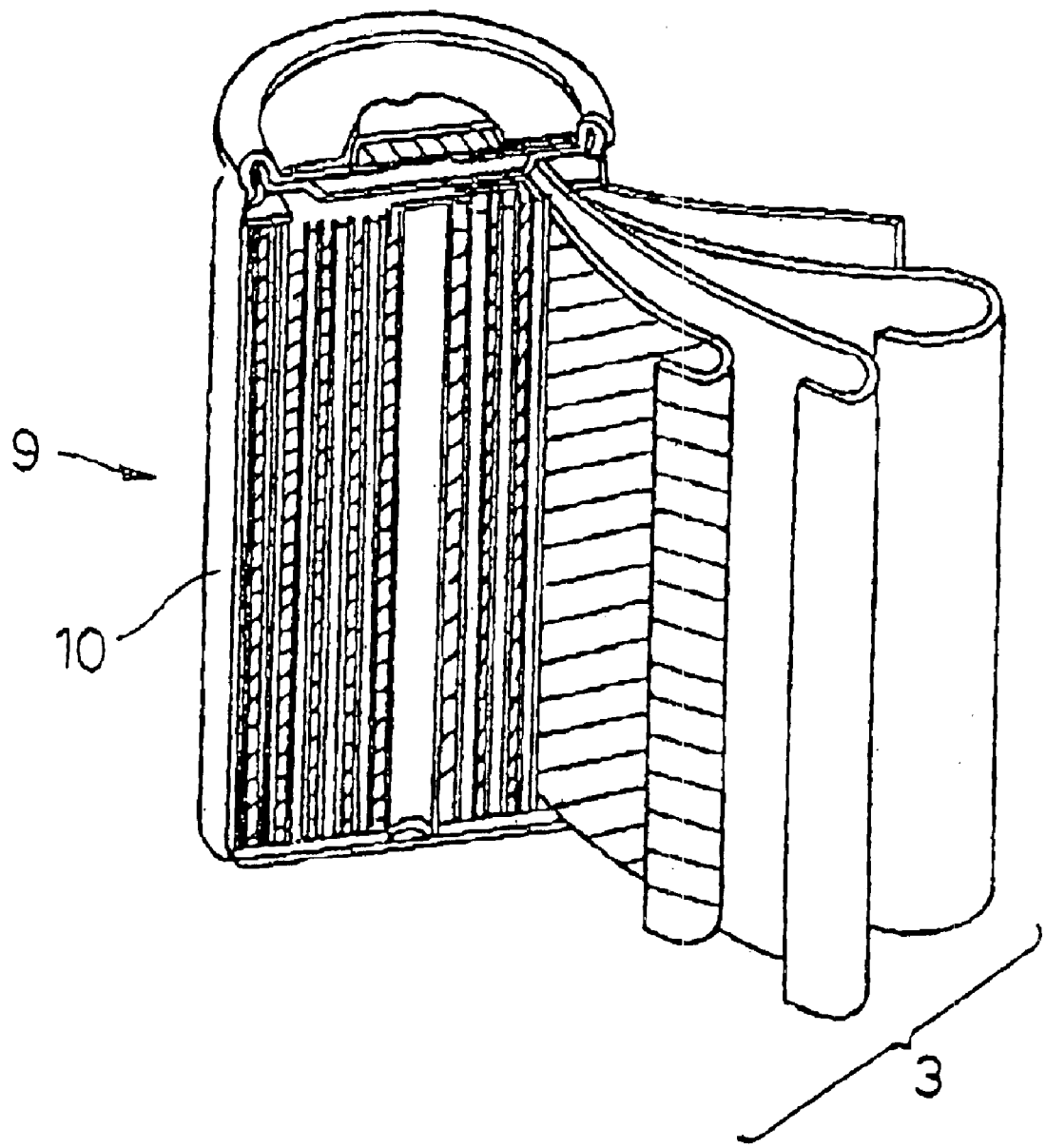
FIG. 3 is a half cross-sectional perspective view of another alkaline rechargeable battery.

FIG. 2 shows an arrangement of a nickel-metal hydride rechargeable battery 1, and FIG. 3 shows an arrangement of an alkaline rechargeable battery 9 having a cylindrical battery case 10. In FIG. 2, the nickel-metal hydride rechargeable battery 1 includes a battery case 2 accommodating, together with an electrolyte, an electrode plate group 3 serving as an element for electromotive force and formed by alternately stacking positive electrode plates having nickel hydroxide as its active material and negative electrode plates having hydrogen-absorption alloy with separators interposed therebetween. An opening of the battery case 2 is closed with a lid 5 having a safety vent 4. Leads 6 are extended upward from an upper edge of each positive electrode plate on one side, and are connected to a positive electrode terminal 7. Similarly, leads 6 are extended upward from an upper edge of each negative electrode plate on the other side, and are connected to a negative electrode terminal 8. The positive electrode terminal 7 and the negative electrode terminal 8 are attached to the lid 5.

In an embodiment, a foamed nickel provided with a 5-mm-wide unfilled portion at the end is filled with a positive electrode material mainly including nickel hydroxide, and a nickel lead is attached to the unfilled portion, whereby a positive electrode plate having a capacity of 1 Ah and a reaction area of 39.3 $cm^2$ is produced. Also, a punched metal provided with a 5-mm-wide uncoated portion at the end is coated with a negative electrode material mainly including hydrogen-absorption alloy of 20 $\mu m$ in average particle diameter, and a nickel lead is attached to the uncoated portion, whereby a negative electrode plate having a capacity of 1.25 Ah and a reaction area of 39.3 cm² is produced.

The positive electrode plate is covered with a pouch-shaped separator made of a 0.18-mm-thick non-woven fabric made of polypropylene fibers having a specific gravity of 0.91. The electrode plate group 3 is formed by alternately stacking the positive electrode plates and the negative electrode plates, which is accommodated in the battery case 2 made of synthetic resin. A connection with the external terminals is established by collecting the leads 6 and bonding their respective top portions to the positive electrode terminal 7 and the negative electrode terminal 8 by means of resistance welding. The battery case 2 is filled with 20 g of an electrolyte mainly including potassium hydroxide, and then is sealed with the lid 5, whereby a nickel-metal hydride rechargeable battery 1 is produced. The battery 1 is then charged and discharged at 0.1 C for activation. The battery 1 thus produced has a capacity of about 7 Ah.

A life test was conducted by using nickel-metal hydride rechargeable batteries produced as above. Conditions of the life test were as follows; the battery was initially charged for 5 hours at 1 A, and in the second cycle and thereafter, the battery was discharged for four hours at 1 A, and charged for four hours and four minutes at 1 A.

(Experiment 1)

Batteries were produced with separators respectively having a thickness of 0.10, 0.14, 0.18, 0.27, 0.41, 0.62, and 0.96 mm. A volume of the separators in the respective batteries accounted for 20, 25, 30, 40, 50, 60, and 70% of a volume of the electrode plate group before the initial charge and discharge. A proportion of the separators in the electrode plate group in volume was calculated based on a thickness of the separators at the cross section measured by cutting the battery before the initial charge and discharge in a direction perpendicular to the electrode plate group. Then, the life characteristics of the respective batteries were measured. The life characteristics were evaluated in terms of a percentage of a capacity, and more specifically, the expiration of the life was judged when a percentage of the battery capacity dropped to 65% or below of the initial capacity of the respective batteries, and the life characteristics were evaluated relatively on a basis of 100 with respect to those of the battery designed to have a percentage of the separators in volume of 30%. The results are set forth in FIG. 1. The capacity density of the battery is also set forth in FIG. 1.

The results reveal that the life characteristics were deteriorated extremely when the percentage of the separators in volume was 20 or 25%. The reason why is assumed that the separators were compressed by the electrode plates expanded while the battery was charged and discharged, and were not able to retain the electrolyte. When the percentage was 70%, the volume of the separators was so large that the capacity density of the battery dropped as low as 80% or below compared with the capacity density when the percentage of the separators in volume was 30%. Also, it became difficult to release heat generated inside the battery to the outside, and the life characteristics were deteriorated compared with those when the percentage was 60%. Hence, it is understood that a preferable percentage of the separators in volume is 30 to 60%.

(Experiment 2)

Batteries were produced by setting a thickness of the separators to 0.18 mm and a percentage of the separators in the electrode plate group in volume before the initial charge and discharge to 30%, and by changing a proportion of voids to 45, 50, 60, 70, and 75%. The life test was conducted in the same manner as was in Experiment 1. Also, the output characteristics of the respective batteries were measured. Herein, after SOC in each battery was adjusted to 60%, each was discharged at a large current, and a current value at which a time required that a voltage of the battery decreased to 1 V was 10 seconds or longer was multiplied by 1 V and outputted as the output characteristics in a unit of W. Each measured value is an average of ten batteries. The test results are set forth in Table 1 below.

TABLE 1

| Proportion of Voids (%) | Life Characteristics (Cycles) | Output Characteristics (W) |
| --- | --- | --- |
| 45 | 1000 | 100 |
| 50 | 5000 | 130 |
| 60 | 6000 | 140 |
| 70 | 5000 | 150 |
| 75 | Short-circuit | Short-circuit |

The results reveal that when the proportion of voids was 75% or higher, a short-circuit occurred during the test, which made it impossible to ensure the reliability. When the proportion of voids was 45% or lower, a volume of retained electrolyte was reduced, and what is worse, the separators were compressed by the expanded electrode plates and a quantity of the retained electrolyte was further reduced, which resulted in deterioration of the life characteristics. consequently, it is understood that an adequate proportion of voids of the separators is 50 to 70%.

(Experiment 3)

Batteries were produced each with an electrode plate group formed by combining positive electrode plates, negative electrode plates, and separators by setting a thickness of the separators to 0.18 mm and a percentage of the separators in the electrode plate group in volume before the initial charge and discharge to 30%, and by changing a percentage of a volume of the electrode plate group in a capacity of the battery case to 83, 85, 90, 95, and 97%. The life test was conducted in the same manner as was in Experiment 1. Also, the output characteristics of the respective batteries were measured in the same manner as were in Experiment 2. The test results are set forth in Table 2 below.

TABLE 2

| Percentage of Electrode Plate Group Volume in Battery Case Capacity | Life Characteristics (Cycles) | Output Characteristics (W) |
| --- | --- | --- |
| 83 | 1000 | 80 |
| 85 | 5000 | 120 |
| 90 | 6000 | 130 |
| 95 | 5000 | 130 |
| 97 | 1000 | 130 |

The results reveal that when the percentage of the volume of the electrode plate group in the capacity of the battery case was 97% or higher, the separators were compressed by the expanded electrode plates, and it became difficult for the separators to retain the electrolyte, which shortened the service life. When the percentage was 83%, the separators were not crushed after the electrode plates expanded due to charging and discharging of the battery. Thereby, an interval between the electrode plates did not reduce, so that smooth migration of electrons was not achieved. Thus, the output characteristics were deteriorated and an internal resistance was increased, whereby the life characteristics were deteriorated. Based on the foregoing, it is understood that an adequate percentage of the volume of the electrode plate group in the capacity of the battery case is 85 to 95%.

It should be noted that the present invention is not limited to a nickel-metal hydride rechargeable battery, and can be applied to a nickel-cadmium battery as well. Also, the invention is applicable not only to a prismatic battery, but also to a cylindrical battery.

According to the alkaline rechargeable battery of the invention, it is possible to prevent compression of the separators that shortens the life of the battery. Also, it prevents the life characteristics from being deteriorated due to difficulty of releasing heat generated inside the battery to the outside. Hence, a total quantity of electricity that the battery can be charged and discharged is increased and the life characteristics of the battery are enhanced. As a result, a battery maintaining a high reliability over a long period is provided.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An alkaline rechargeable battery comprising:

an electrode plate group formed by superimposing a positive electrode plate and a negative electrode plate with a separator interposed there between, the positive electrode plate comprising a positive electrode material mainly including nickel hydroxide; and a battery case that accommodates the electrode plate group, wherein a volume of the separators before initial charge and discharge accounts for 30 to 60% of a volume of the electrode plate group.

2. The alkaline rechargeable battery according to claim 1, wherein a proportion of voids of the separators before the initial charge and discharge is 50 to 70%.

3. The alkaline rechargeable battery according to claim 1, wherein a percentage of the volume of the electrode plate group before the initial charge and discharge in a capacity of the battery case is 85 to 95%.

4. The alkaline rechargeable battery according to claim 1, wherein the thickness of the separator is less than 0.5 mm.

* * * * *